US006677420B2

(12) United States Patent
Richard et al.

(10) Patent No.: US 6,677,420 B2
(45) Date of Patent: Jan. 13, 2004

(54) POLYMERISABLE COMPOSITIONS FOR MAKING TRANSPARENT POLYMER SUBSTRATES, RESULTING TRANSPARENT POLYMER SUBSTRATES, AND USES THEREOF IN OPTICS

(75) Inventors: Gilles Richard, Quincy Voisins (FR); Odile Primel, Vincennes (FR); Leanirith Yean, Longjumeau (FR)

(73) Assignee: Essilor International Compagnie Generale d'Optique, Charenton cedex (FR)

( * ) Notice: Subject to any disclaimer, the term of this patent is extended or adjusted under 35 U.S.C. 154(b) by 0 days.

(21) Appl. No.: 10/061,761

(22) Filed: Feb. 1, 2002

(65) Prior Publication Data

US 2003/0027960 A1 Feb. 6, 2003

Related U.S. Application Data

(63) Continuation of application No. PCT/FR00/02213, filed on Aug. 1, 2000.

(30) Foreign Application Priority Data

Aug. 2, 1999 (FR) ............................................. 99 10032

(51) Int. Cl.$^7$ ............................................. C08F 126/02
(52) U.S. Cl. ........................ 526/301; 526/261; 526/320; 526/333
(58) Field of Search ................................. 526/261, 301, 526/320, 333

(56) References Cited

U.S. PATENT DOCUMENTS

| 4,138,538 A | 2/1979 | Kaetsu et al. ................. 526/73 |
| 4,650,845 A | 3/1987 | Hegel .......................... 526/261 |
| 4,912,185 A | 3/1990 | Toh ............................. 526/301 |
| 5,183,870 A | 2/1993 | Fukushima et al. .......... 526/273 |
| 5,566,027 A | 10/1996 | Saitoh et al. ................ 359/796 |
| 5,880,171 A | 3/1999 | Lim et al. .................... 523/106 |

FOREIGN PATENT DOCUMENTS

| EP | 0441383 | 8/1991 |
| EP | 0453149 | 10/1991 |

OTHER PUBLICATIONS

Co-pending U.S. patent application No. 09/824,998, filed Apr. 2, 2001, by Gilles Richard et al.

*Primary Examiner*—Helen L. Pezzuto
(74) *Attorney, Agent, or Firm*—Fulbright & Jaworski L.L.P.

(57) ABSTRACT

The invention is a composition comprising: 40 to 95 parts by weight of one or several monomers (I) of formula (a) wherein: $R_1$ and $R_2$ represent H or CH; A represents a divalent radical of formula (b) or (c) wherein $m_1$ and $m_2$ represent each an integer ranging between 2 and 6; and 5 to 50 parts by weight of a monomer (II) comprising at least a urethane unit and at least two (meth)acrylate functions. The invention is useful for making optical and ophthalmic articles.

25 Claims, No Drawings

POLYMERISABLE COMPOSITIONS FOR MAKING TRANSPARENT POLYMER SUBSTRATES, RESULTING TRANSPARENT POLYMER SUBSTRATES, AND USES THEREOF IN OPTICS

This application is a continuation of PCT Application No. PCT/FR00/02213 filed Aug. 1, 2000, which claims priority to French Application No. 99/10032 filed Aug. 2, 1999.

BACKGROUN OF THE INVENTION

1. Field of the Invention

The present invention relates to the field of compositions of polymerisable monomers which, after polymerisation, give transparent polymer substrates, and to their use for making optical, particularly ophthalmic, lenses.

2. Description of Related Art

Optical lenses for ophthalmic use made from organic polymer materials are known and have been used for many years.

One of the most widely used materials is obtained by polymerisation of compositions containing diethylene glycol diallyl carbonate (subsequently referred to as CAD).

This monomer is commercially available, for example under the trade name CR39®.

An example of a commercial ophthalmic lens in a material of this type is the ORMA® lens.

This material has intrinsically good mechanical properties, in particular impact strength and scratch resistance, as well as good resistance to organic solvents.

This material may also be readily coloured when desired by the customer.

One of the disadvantages of the use of CAD is the fact that the polymerisation of this monomer is essentially performed thermally, with particularly long heat cycles (several hours or even days).

It would thus be desirable to reduce the length of these polymerisation cycles so as, amongst other reasons, to be able to respond to customers as quickly as possible, to limit the length of time that the moulds used for the lens production are in use, and to reduce the manufacturing costs.

In addition, although CAD materials are generally satisfactory, it would also be desirable to produce materials with improved intrinsic properties.

Various types of materials have already been proposed in the prior art.

The patent U.S. Pat. No. 4,138,538 discloses compositions of allyl monomers such as CAD, containing a methacrylic monomer such as a polyethylene glycol di(meth)acrylate.

This methacrylic monomer may be used at a concentration of 20 to 70% by weight of the polymerisable mixture.

The mixture is photopolymerised, preferably at low temperature, then a thermal treatment is performed.

The patent U.S. Pat. No. 4,650,845 discloses monomer compositions comprising from 0 to 100 parts by weight of a first component which is a poly(meth)acrylate urethane monomer, and from 100 to 0 parts by weight of a second component which is a composition containing:

A) from 30 to 60% by weight of a polyacrylate monomer,
B) from 20 to 70% by weight of a modifier of the shrinkage during the polymerisation,
C) from 0 to 30% by weight of a diluent monomer.

The compositions are preferably photopolymerised.

In practice, the compositions disclosed generally lead to highly crosslinked polymers due to the presence of monomers containing multiple functional groups.

The compositions generally contain monomers containing at least 4 (meth)acrylate groups.

The patent U.S. Pat. No. 4,912,185 discloses compositions of polymerisable monomers, for the production of ophthalmic lenses or video discs, comprising at least one polyoxyalkylene glycol acrylate or methacrylate monomer, at least one crosslinking agent containing several unsaturated functions and at least one urethane monomer with 2 to 6 methacrylic end groups.

In practice, the crosslinking agent cited above contains 3 to 4 vinyl, acrylic or methacrylic functional groups.

Such compositions are preferably hardened by mixed UV/thermal polymerisation.

The patent EP-A-453149 discloses compositions containing a polyoxyalkylene glycol di(meth)acrylate monomer; a monomer containing a bisphenol A unit and leading, by homopolymerisation, to a polymer with refractive index greater than 1.55 and a urethane monomer with 2 to 6 (meth)acrylic end groups.

The polymerisation is preferably mixed UV/thermal.

The U.S. Pat. No. 5,183,870 discloses compositions comprising from 10 to 60% by weight of a polybutylene glycol di(meth)acrylate, from 20 to 80% by weight of a poly(meth)acrylate urethane, from 5 to 60% by weight of a specific mono(meth)acrylate monomer and from 0 to 60% by weight of a compound having at least one polymerisable double bond.

According to the U.S. Pat. No. 5,183,870, the choice of the polybutylene glycol di(meth)acrylate is essential to achieve a good compromise between impact strength and low water absorption properties.

Comparative example 7 discloses a composition containing a polyethylene glycol di(meth)acrylate, a dimethacrylate urethane and a tricyclo[$5.2.1.0^{2,6}$]decan-8-yl methacrylate.

The polymer resulting from this composition has a high water absorption level of 3.6%.

The U.S. Pat. No. 5,880,171 discloses photopolymerisable compositions containing:

from 20 to 90%, and preferably at least 50% by weight of an epoxy or polyester urethane oligomer with (meth)acrylate end groups and 5 to 80% by weight of an optional diluent which is a hydrocarbon diol ester with (meth)acrylate and/or tri, tetra or poly(meth)acrylate end groups.

The U.S. Pat. No. 5,566,027 discloses photopolymerisable compositions comprising from 25 to 45% of a polyester urethane oligomer containing several (meth)acrylic groups linked to a polyester oligomer via a urethane group and having a molecular weight of at least 700, from 31 to 70% by weight of a polyfunctional (meth)acrylate with an average molecular weight of at least 700 and from 5 to 55% by weight of a monofunctional (meth)acrylate.

This composition is used as a varnish applied to ophthalmic lenses.

There is no provision for the use of a composition of this type to produce the body of the lens.

Thus it can be seen that many polymerisable compositions leading to materials with refractive index of the order of 1.5 have been proposed in the prior art, without however giving complete satisfaction for producing transparent polymer substrates usable in the optics field.

SUMMARY OF THE INVENTION

A first object of the present invention is thus to provide new compositions of polymerisable monomers leading to transparent polymer substrates able to be substituted for CAD-based polymers, in other words with properties which are overall similar to those of CAD, and preferably better.

The optical substrates must in particular have all the following properties:

high transparency (transmission generally greater than 85%, and preferably greater than or equal to 90%), with an absence of, or only very slight, diffusion of the light, low density, less than 1.4, preferably less than 1.3 and even better less than 1.2, refractive index between 1.48 and 1.52, high Abbe number, greater than or equal to 40, preferably greater than or equal to 45 and even better greater than or equal to 50, so as to avoid chromatic aberrations, absence of colour after polymerisation, in particular a low yellow index and an absence of yellowing over time, good impact strength (in particular an uncoated lens should preferably pass the FDA ball dropping test), good resistance to static stresses, good scratch resistance, good suitability for accepting different treatments (deposit of hard, anti-reflection, primary anti-shock coatings, etc.), and particular good suitability for coloration, good suitability for surface and edge finishing treatments, without the overall geometry of the lens being distorted during such operations, low water absorption level.

The polymer substrates according to the invention have a water absorption level which is preferably less than 1.5% and more preferably less than 1%.

A second object of the invention is to provide compositions which may be readily and rapidly polymerised, in particular by photopolymerisation or by mixed photo- and thermal polymerisation techniques, so as to reduce the length of the lens production cycle.

The composition of the polymerisable monomers according to the invention comprises:

40 to 95 parts by weight of one or more monomers (I) of formula:

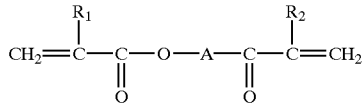

in which
R$_1$ and R$_2$ represent H or CH$_3$,
A represents a divalent radical of formula:

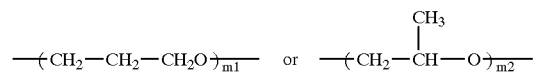

m$_1$ and m$_2$ are each integers varying from 2 to 6, and 5 to 50 parts by weight of a monomer (II) comprising at least one urethane unit and at least two (meth)acrylate functions.

The composition of monomers according to the invention generally has a viscosity less than or equal to 0.3 Pa.s, preferably less than 0.2 Pa.s.

The first important component of the compositions according to the invention is the monomer or monomers (I) corresponding to the formula above.

More exactly, it consists of (meth)acrylic esters of propylene glycol containing a central radical A, which may be linear or branched, such as defined above.

The first component is a monomer or mixture of monomers (I) with relatively short chain lengths, in other words the number of propylene glycol units present in the radical A must be equal to or less than 6 and preferably between 2 and 6 for each of the monomers (I).

When several monomers (I) are used in a mixture, an average value may be defined:

$$\overline{m} = \sum_{m=2}^{6} X_m \cdot m$$

in which $X_m$ is the ratio by weight of monomer (I) for which A contains m propylene glycol units in its chain compared to the total weight of monomers of formula (I).

When commercially available products which are already mixtures of monomers are used as the first component of the invention, this value $\overline{m}$ may easily be obtained by HPLC analysis of the mixture followed by the calculation $$Xm = \frac{Sm}{S\ total}$$

where Sm represents the area of the peak corresponding to the monomer (I) containing m propylene glycol units in the divalent radical A, and S represents the total area of all the peaks corresponding to the monomers (I) for which m varies from 2 to 6.

According to the invention, it is preferable to use mixtures of several monomers (I) whose average value $\overline{m}$ as defined above is less than 5 and preferably varies from 2 to 4.

It is also preferable that the monomers (I) have a branched structure, in other words that the radical A represents:

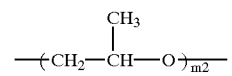

m$_2$ having the meaning stated previously.

The compositions according to the invention comprise from 50 to 95 parts by weight of monomer (I), the total weight of monomers (I) and (II) representing 100 parts by weight.

It is preferable to use a mixture of several monomers (I) whose central unit A is:

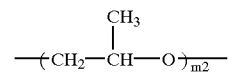

with m$_2$ being an integer with value from 2 to 6 according to the following mass ratios m$_2$=2 27% m$_2$=3 47% m$_2$=4 20% m$_2$=5 4% m$_2$=6 2% with an average value $\overline{m}_2$=3.07.

This mixture will be referred to in the remainder of this application as PPG 200 di(meth)acrylate (or PPG 200 DMA).

In general the first component contributes rigidity to the polymer network comprising the final substrate.

The second component of the compositions according to the invention is a monomer or mixture of monomers (II) comprising at least one urethane unit and at least two (meth)acrylate functions.

Two families of monomers (II) with urethane units are preferably used.

The first family consists of urethane di(meth)acrylate oligomers, and, preferably, those which are aliphatic polyesters.

Examples of such compounds are the urethane di(meth) acrylate oligomers from the company Cray Valley, in particular the product known under the trade name CN934®.

The second family consists of monomers (II) with the formula

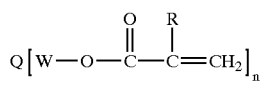

in which Q is a radical of valency n, with linear, branched or cyclic structure, containing at least two units of formula:

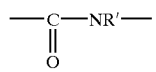

W is a divalent alkyl radical, with linear or branched structure, with from 1 to 5 carbon atoms.
n varies from 2 to 4
R represents H or $CH_3$—, and
R' represents H or a valence bond
W preferably represents the radical —$CH_2CH_2$—
Q preferably represents a divalent radical of formula:

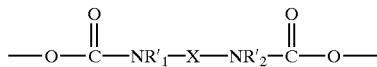

in which X represents a linear or branched divalent alkyl chain with from 1 to 15 carbon atoms, preferably 8 to 12 carbon atoms.
$R'_1$ and $R'_2$ independently represent H or $CH_3$.
A monomer of this type is commercially available under the trade name PLEX® 6661-0 and has the formula:

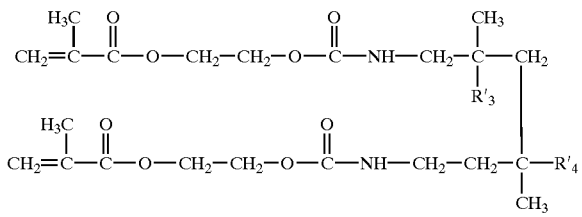

in which $R'_3$ and $R'_4$ independently represent H or $CH_3$.

Among the second family of monomers (II), other preferred monomers are those in which Q represents a trivalent radical of formula:

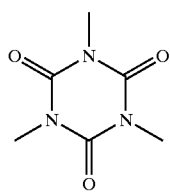

Monomers of this type which are commercially available have the formula:

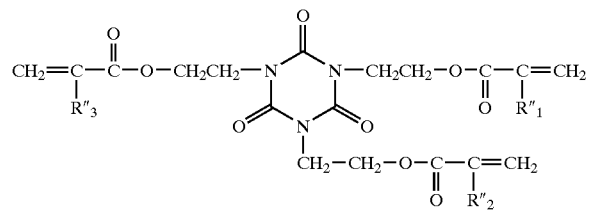

in which $R''_1$, $R''_2$ and $R''_3$ independently represent H or $CH_3$.

The monomer of the above formula in which $R''_1$, $R''_2$ and $R''_3$ each represent a methyl group is available from the company Cray Valley under the trade name SR290.

The monomer of the above formula in which $R''_1$, $R''_2$ and $R''_3$ each represent a hydrogen atom is available from the company Cray Valley under the trade name SR368.

The monomer (II) is present in a proportion of 5 to 50 parts by weight, preferably 10 to 40 parts by weight compared to the total weight of monomers (I) and (II).

Commercially available monomers include:
1. aliphatic diacrylate urethanes
   CN934, 964, 965, 963, 966, 967, 981 from the company Cray Valley;
   EBECRYL 230, 244, 245, 270, 284, 285, 4830, 4835, 8800 from the company UCB;
2. aromatic diacrylate urethanes
   CN970, 972, 973 and 976 from the company Cray Valley;
   EBECRYL 210, 215, 4244 from the company UCB;
3. urethane acrylates with functionality $\geq 3$
   Triacrylate: CN920, 922, 923, 924, 929 (Cray Valley)
   EBECRYL 204, 205, 254, 264, 265 (UCB)
   Tetracrylate: CN925, 945, 995 (Cray Valley)
   U4HA (SHIN NAKAMURA)
   Hexaacrylate: CN975 (Cray Valley)
   EBECRYL 220, 1290, 2220, 5129 (UCB);
   U6HA (SHINNAKAMURA)
4. aliphatic methacrylate urethanes
   PLEX® 66610 (ROHM);
   U4H (tetrafunctional methacrylate from SHIN NAKAMURA).

The monomer compositions according to the invention may include other polymerisable monomers (III) different from monomers (I) and (II), which may integrate into the final network obtained, in particular monomers polymerisable by free radical mechanisms.

These monomers (III) represent from 0 to 30%, preferably 0 to 10% by weight, compared to the total weight of monomers (I) and (II).

These monomers (III) may include the alkyl (meth)acrylates such as methyl (meth)acrylate and ethyl (meth)acrylate, the cycloallkyl (meth)acrylates such as cyclohexyl (meth)acrylate and dicyclopentyl (meth)acrylate, phenyl (meth)acrylate, benzyl (meth)acrylate, the naphthyl (meth)acrylates, the phenoxyalkyl (meth)acrylates such as phenoxyethyl (meth)acrylate and phenoxybutyl (meth)acrylate, the alkylene glycol di(meth)acrylates such as ethylene glycol di(meth)acrylate and propylene glycol di(meth)acrylate, the poly(alkylene) glycol di(meth)acrylates different from the monomers (I) such as poly(ethylene) and poly(butylene) glycol di(meth)acrylates, neopentyl glycol di(meth)acrylate, compounds of bisphenol-A di(meth)acrylates and their mixtures.

The compounds of bisphenol-A di(meth)acrylates include compounds of formula:

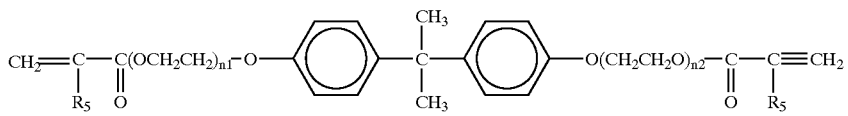

in which $R_5$ represents H or $CH_3$ and $n_1+n_2$ has an average value of from 0 to 40.

Preferred compounds corresponding to the above formula are those for which $R_5=CH_3$ and $\overline{n_1+n_2}=2.6$ (EBADMA), $\overline{n_1+n_2}=4$ (DBADMA), $\overline{n_1+n_2}=10$ (OBADMA) and $\overline{n_1+n_2}=30$.

The monomer (III) may be one monomer or a mixture of monomers corresponding to the chemical structure of monomer (I) and for which $m_1$ or $m_2$ is an integer greater than 6, generally from 7 to 20. In this case, the quantity of monomers (III) is such that the mean $$\overline{m} = \sum_{m=1}^{20} X_m \cdot m$$

remains less than 5.

The additional monomer (III) may be a monomer with high Abbe number and containing one or more (meth) acrylate functions.

By monomer with high Abbe number should be understood a monomer able to generate, by homopolymerisation, a transparent polymer with high Abbe number, in other words at least 50, and preferably at least 55.

The monomer with high Abbe number preferably contains at least one non-aromatic cyclic or polycyclic hydrocarbon radical.

The monomer (III) with high Abbe number is preferably selected from at least one of the monomers of the following formula:

In these formulas:

Y is a divalent radical selected from $-O-$, $-CH_2-$, $-C(CH_3)_2-$, $-C(H)(CH_3)$ Z is a divalent radical selected from $-(CH_2)_p-O-$ p being an integer from 1 to 4, and

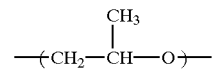

$R_a$, $R_b$ represent H or $CH_3$ $R_c$, $R_d$ independently represent a linear or branched alkyl radical with 1 to 6 carbon atoms $R_i$, $R_j$ independently represent a linear or branched alkyl radical with 1 to 10 carbon atoms w is an integer from 1 to 3, x is an integer from 0 to 3, y is an integer from 0 to 3, on condition that $x+y \geq 1$, k is an integer from 0 to 6, l is an integer from 0 to 6, r is an integer from 0 to 6, s is an integer from 0 to 6, z is an integer from 0 to 3, and t is an integer from 0 to 3.

The monomers (III) with high Abbe number which are particularly preferred are selected from the monomers of formula:

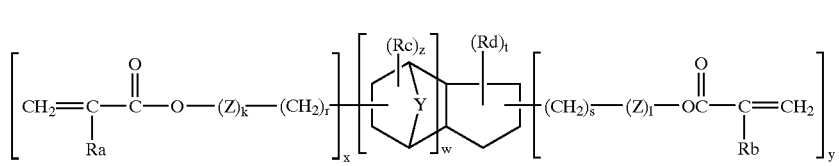

(A1)

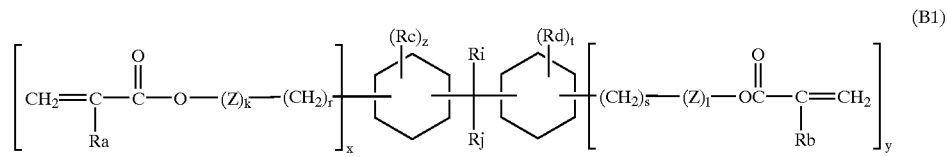

(B1)

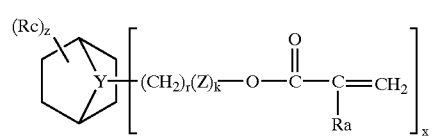

(C1)

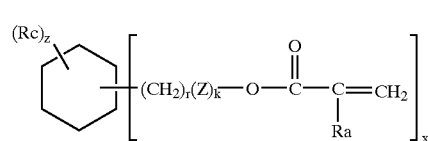

(D1)

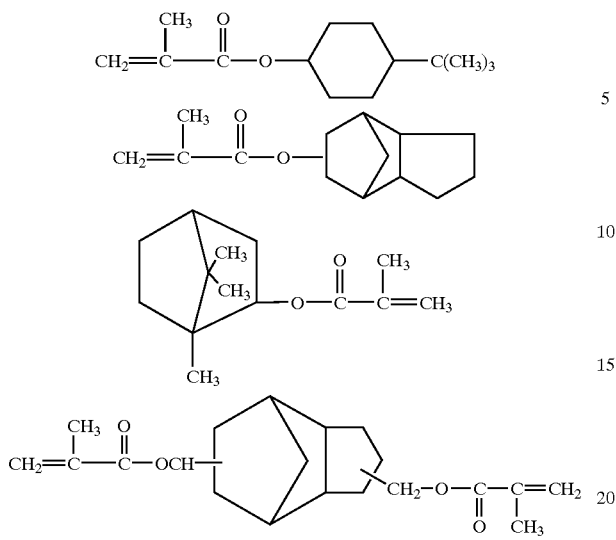

The compositions according to the invention also contain a system for initiating the polymerisation. The system for initiating the polymerisation may comprise one or more agents for initiating thermal or photochemical polymerisation or a mixture of thermal and photochemical initiation agents. These initiators are well known in the state of the art and any conventional initiator may be used. The thermal polymerisation initiators which may be used in the present invention include the peroxides such as benzoyl peroxide, cyclohexyl peroxydicarbonate, and isopropyl peroxydicarbonate.

The photoinitiators include in particular 2,4,6-trimethylbenzoyldiphenylphosphine oxide, 1-hydroxycyclohexyl phenyl ketone, 2,2-dimethoxy-1,2-diphenylethan-1-one, and the alkyl benzoyl ethers.

The initiators are in general used in a proportion of 0.01 to 5% by weight compared to the total weight of polymerisable monomers in the composition.

The polymerisable compositions according to the invention may also contain additives conventionally used in polymerisable compositions for moulding optical or ophthalmic articles, in particular spectacle glasses and lenses, in conventional proportions, for example inhibitors, colorants, UV absorbers, perfumes, deodorants, antioxidants, anti-yellowing agents and photochromic compounds.

The compositions according to the invention may be polymerised thermally, photochemically or by a combination of the two methods.

DESCRIPTION OF ILLUSTRATIVE EMBODIMENTS

The present invention will now be described in more detail in the following examples. In the examples, except where otherwise stated, all percentages and parts are expressed by weight.

EXAMPLES 1 to 17

1) Preparation of the Compositions

The polymerisable compositions listed in table I below were prepared by the following method:

The different components of the compositions were weighed in a room with controlled lighting, in smoked glass flasks.

PPG200DMA, monomer (I), and the co-monomers (II), a photoinitiator and a UV absorber were mixed by stirring maintained for several minutes. A thermal initiator, stored at low temperature, was added as a final step (for reasons of stability).

2) Casting Process

The compositions prepared as described above were cast into two-part inorganic glass moulds previously cleaned with soda, assembled in parallel 2 mm apart with Barnier adhesive tape. The moulding was performed as follows:

Taking up the composition in a sterile syringe (20 ml)

Peeling back a little of the adhesive tape to create an opening

Insertion of the syringe nozzle into the opening

Injection of the composition into the mould

Refixing the adhesive tape to seal the mould.

3) Photochemical Prepolymerisation

The filled moulds were placed in a photochemical polymerisation oven composed of two U.V. PRIMA lamps (mercury lamps) positioned equidistantly on either side of the moulds and each mould received from each lamp an illumination of about:

40 mW/m$^2$ 125 mW/cm$^2$

The conversion of the (meth)acrylic double bonds as a function of the UV irradiation time was monitored by infrared measurements.

4) Thermal Polymerisation and Annealing

After polymerisation, the adhesive tape was removed and the assembly placed in an oven at 100° C. for two hours to effect the polymerisation; the glasses were then removed from the mould and checked under an arc lamp. A final annealing of two hours at 120° C. completed the polymerisation and relaxed the residual stresses of the substrate obtained.

The properties of the substrates obtained are shown in table 1.

The yellow index YI was measured according to ASTM standard D1925.

Colorability measurement (% Tv red)

The measurement given is the value of the transmission measured in the visible of a lens of 2 mm thickness at the centre coloured by soaking in an aqueous bath at 94° C. in which the red pigment "disperse Red 13" from Eastman Kodak had been dispersed.

The measurement of Tg was performed by DMA (dynamic mechanical analysis) on a flat sample 5.2 cm×1 cm×2 mm (thick).

The test was performed by 3 point bending.

Tg corresponds to the maximum of the ratio $$\frac{E''\text{(loss modulus)}}{E'\text{(conservation modulus)}}$$

TABLE I

| | EXAMPLE No. | | | | | | | | |
|---|---|---|---|---|---|---|---|---|---|
| | 1 | 2 | 3 | 4 | 5 | 6 | 7 | 8 | 9 |
| PPG 200 dimethacrylate Parts by weight | 95 | 90 | 85 | 95 | 90 | 85 | 80 | 75 | 95 |
| Urethane co-monomer Parts by weight | | | | | | | | | |
| U4H | 5 | 10 | 15 | — | — | — | — | — | — |
| CN965 | — | — | — | 5 | 10 | 15 | 20 | 25 | — |
| CN934 | — | — | — | — | — | — | — | — | 5 |
| Ebecryl ® 270 | — | — | — | — | — | — | — | — | — |
| Ebecryl ® 8800 | — | — | — | — | — | — | — | — | — |
| Photoinitiator CGl 1850 (%) | 0.06 | 0.06 | 0.06 | 0.06 | 0.06 | 0.06 | 0.06 | 0.06 | 0.06 |
| Thermal initiator tBPEH (%) | 0.1 | 0.1 | 0.1 | 0.1 | 0.1 | 0.1 | 0.1 | 0.1 | 0.1 |
| UV absorber UV 5411 (%) | 0.08 | 0.08 | 0.08 | 0.08 | 0.08 | 0.08- | 0.08 | 0.08 | 0.08 |
| $n_e$ | 1.493 | 1.495 | 1.494 | 1.493 | 1.495 | 1.494 | 1.494 | 1.494 | 1.494 |
| $v_e$ | 58 | 55 | 57 | 55 | 55 | 57 | 55 | 56 | 55 |
| d | | | | | | | | | |
| Yl (2 mm) | 1.8 | 1.9 | 1.8 | 1.9 | 2.0 | 2.5 | 3.8 | 3.8 | 1.7 |
| % Tv red | 72 | 76 | 80 | 69 | 64 | 40 | 35 | 32 | 63 |
| Tg (° C.) | — | — | 140 | — | 135 | 130 | — | 115 | — |
| E'25° C. (MPa) | — | — | 2200 | — | 2600 | 1900 | — | 1800 | — |
| E'100° C. (MPa) | — | — | 750 | — | 1100 | 490 | — | 380 | — |

| | EXAMPLE No. | | | | | | | |
|---|---|---|---|---|---|---|---|---|
| | 10 | 11 | 12 | 13 | 14 | 15 | 16 | 17 |
| PPG 200 dimethacrylate Parts by weight | 90 | 80 | 75 | 70 | 90 | 80 | 90 | 80 |
| Urethane co-monomer Parts by weight | | | | | | | | |
| U4H | — | — | — | — | — | — | — | — |
| CN965 | — | — | — | — | — | — | — | — |
| CN934 | 10 | 15 | 20 | 25 | — | — | — | — |
| Ebecryl ® 270 | — | — | — | — | 10 | 20 | — | — |
| Ebecryl ® 8800 | — | — | — | — | — | — | 10 | 20 |
| Photoinitiator CGl 1850 (%) | 0.06 | 0.06 | 0.06 | 0.06 | 0.06 | 0.06 | 0.06 | 0.06 |
| Thermal initiator tBPEH (%) | 0.1 | 0.1 | 0.1 | 0.1 | 0.1 | 0.1 | 0.1 | 0.1 |
| UV absorber UV 5411 (%) | 0.08 | 0.08 | 0.08 | 0.08 | 0.08 | 0.08 | 0.08 | 0.08 |
| $n_e$ | 1.494 | 1.495 | 1.494 | 1.494 | 1.493 | 1.493 | 1.495 | 1.496 |
| $v_e$ | 54 | 55 | 55 | 55 | 55 | 56 | 54 | 55 |
| d | | | | | | | | |
| Yl (2 mm) | 1.7 | 1.7 | — | 1.8 | 1.8 | 1.5 | 2.1 | 2.7 |
| % Tv red | 58 | 45 | 39 | 33 | 56 | 49 | 55 | 50 |
| Tg (° C.) | — | 116 | 108 | 104 | — | — | — | 120 |
| E'25° C. (MPa) | — | 2050 | 1920 | 1780 | — | — | — | 2200 |
| E'100° C. (MPa) | — | 490 | 380 | 280 | — | — | — | 495 |

The impact strength was determined on 21 lenses of −2 dioptres, with thickness at centre 1.07 mm, obtained by polymerisation of the composition of example 12, as described above. In the test, balls were dropped with increasing energy on the centre of the lens until the lens starred or broke. The average breaking energy was then calculated.

The average breaking energy was 1900±500 mJ.

EXAMPLES 18 to 30

The polymerisable compositions of table II below were prepared as before.

The properties of the substrates obtained are given in table II.

These properties were determined as for the previous examples.

TABLE II

| | EXAMPLE No. | | | | | | |
|---|---|---|---|---|---|---|---|
| | 18 | 19 | 20 | 21 | 22 | 23 | 24 |
| PPG 200 dimethacrylate - Parts by weight | 63 | 56 | 49 | 54 | 48 | 40 | 30 |
| CD6440P (Cray Valley) - Parts by weight | 27 | 24 | 21 | 36 | 32 | 40 | 30 |
| Urethane co-monomer - Parts by weight | | | | | | | |
| PLEX ® 6610 | 10 | 20 | 30 | 10 | 20 | 20 | 40 |
| SR290 | — | — | — | — | — | — | — |
| U4H | — | — | — | — | — | — | — |
| CN934 | — | — | — | — | — | — | — |
| CN964 | — | — | — | — | — | — | — |
| SR368 | — | — | — | — | — | — | — |
| % by weight monomer (l)/ total monomers | 75.1 | 66.8 | 58.4 | 70.2 | 62.4 | 58 | 43.5 |
| Photoinitiator CGI 1850 (%) | 0.06 | 0.06 | 0.06 | 0.06 | 0.06 | 0.06 | 0.06 |
| Thermal initiator tBPEH (%) | 0.1 | 0.1 | 0.1 | 0.1 | 0.1 | 0.1 | 0.1 |
| UV absorber UV 5411 (%) | 0.08 | 0.08 | 0.08 | 0.08 | 0.08 | 0.08 | 0.08 |
| $n_e$ | 1.493 | 1.496 | 1.498 | 1.493 | 1.495 | 1.490 | 1.500 |
| $\nu_e$ | 55 | 56 | 56 | 56 | 55 | 55 | 56 |
| d | 1.13 | 1.15 | 1.15 | 1.13 | 1.14 | 1.13 | 1.13 |
| YI(2 mm) | 1.5 | 1.2 | 1.2 | 1.5 | 1.5 | 1.5 | 1.2 |
| % Tv red | 45 | 49 | 49 | 45 | 45 | 42 | 51 |
| Tg(° C.) | 102 | — | 118 | 100 | 104 | 84 | 114 |
| E'25° C.(MPa) | 2000 | — | 2200 | 1650 | 1870 | 1350 | 2290 |
| E'100° C.(MPa) | 350 | — | 420 | 285 | 320 | 170 | 359 |

| | EXAMPLE No. | | | | | |
|---|---|---|---|---|---|---|
| | 25 | 26 | 27 | 28 | 29 | 30 |
| PPG 200 dimethacrylate - Parts by weight | 63 | 54 | 54 | 54 | 54 | 54 |
| CD6440P (Cray Valley) - Parts by weight | 27 | 36 | 36 | 36 | 36 | 36 |
| Urethane co-monomer - Parts by weight | | | | | | |
| PLEX ® 6610 | — | — | — | — | — | — |
| SR290 | 10 | 10 | — | — | — | — |
| U4H | — | — | 10 | — | — | 25 |
| CN934 | — | — | — | 10 | — | — |
| CN964 | — | — | — | — | 10 | — |
| SR368 | — | — | — | — | — | 10 |
| % by weight monomer (1)/ total monomers | 75.1 | 70.2 | 70.2 | 70.2 | 70.2 | 70.2 |
| Photoinitiator CGI 1850 (%) | 0.06 | 0.06 | 0.06 | 0.06 | 0.06 | 0.06 |
| Thermal initiator tBPEH (%) | 0.1 | 0.1 | 0.1 | 0.1 | 0.1 | 0.1 |
| UV absorber UV 5411 (%) | 0.08 | 0.08 | 0.08 | 0.08 | 0.08 | 0.08 |
| $n_e$ | 1.495 | 1.495 | 1.494 | 1.491 | 1.492 | 1.494 |
| $\nu_e$ | 54 | 56 | 55 | 54 | 57 | 56 |
| d | 1.15 | 1.15 | 1.14 | 1.13 | 1.13 | 1.15 |
| YI(2 mm) | 1.6 | 1.7 | — | 1.4 | 1.5 | 1.4 |
| % Tv red | 43 | 40 | 41 | 39 | 39 | 46 |
| Tg(° C.) | 106 | 109 | — | 88 | 88 | — |
| E'25° C.(MPa) | 1770 | 1600 | — | 1330 | 1430 | — |
| E'100° C.(MPa) | 486 | 400 | — | 180 | 196 | — |

TABLE II-continued

CGI1850 = photoinitiator from the company CIBA GEIGY composed of a mixture (in mass ratio 50/50) of

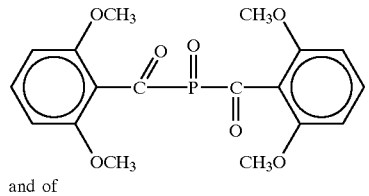

and of

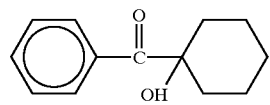

tBPEH = tert-butyl peroxy-2-ethylhexanoate
UV 5411 = 2-(2'-hydroxy-5'-t-octylphenyl)benzotriazole from the company American Cyanamid
$n_e$ = refractive index
$v_e$ = Abbe number
d = density
Yi = yellow index
E'25
E'100 } = elastic moduli at 25° C. and 100° C. respectively The viscosities were determined on 250 ml samples at 25° C. by means of a BROOKFIELD model DV2 viscometer at shearing speeds varying from 6 to 60 rpm (mobile No. 61 or No. 62). The mobile No. 61 was used at a shearing speed of 12 rpm.

The refractive indexes (λ=546 nm) and the Abbe numbers were determined at 25° C. using a BELLINGHAM-STANLEY LIMITED ABBE 60/TR with different lamps (sodium, mercury and cadmium) at light sources.

The DMA analyses were performed with a Rheometrics Solid Analyser RSA II on 52×10×2 mm samples, at a frequency of 1 Hz and over a temperature range of −50° C. to 170° C. at 2° C./minute.

The impact strength of the lenses (power −2 dioptres and thickness at centre 1.10 mm) was determined by polymerisation of a reference composition CD6440P/PPG 200 DMA 30/70 under the conditions described above. The average breaking strength was 1200±900 mJ and two lenses out of 18 failed the test.

The impact strength of 20 lenses of power −2 dioptres and thickness at centre 1.09 mm obtained by polymerisation of the composition of example 22 was also determined. The average breaking strength was 1200±800 mJ and 1 lens out of 20 failed the test.

The impact strength test consisted of dropping balls with increasing energy on the centre of the lens until the lens broke (breakage or starring). The average breaking energy was thus determined.

A water absorption test was performed on the lenses of examples 6 and 12. The lenses, dried in an oven, were weighed, then immersed in water at 90° C. for 30 minutes. The lenses were recovered, then reweighed.

The water absorption level was determined as:

$$T_{water} = \frac{\text{Weight after water treatment} - \text{Initial weight}}{\text{Initial weight}} \times 100$$

The lenses of examples 6 and 12 gave figures of 0.59 and 0.74% respectively.

CD6440P is a mixture of several monomers corresponding to the general formula (I) whose repeating unit is

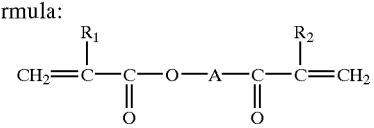

with $m_2$ being an integer with values from 3 to 10 according to the following mass ratios:

| | |
|---|---|
| $m_2 = 3$ | 2% |
| $m_2 = 4$ | 8% |
| $m_2 = 5$ | 14% |
| $m_2 = 6$ | 20% |
| $m_2 = 7$ | 27% |
| $m_2 = 8$ | 19% |
| $m_2 = 9$ | 9% |
| $m_2 = 10$ | 1%. |

What is claimed is:
1. A composition of polymerizable monomers comprising:
− 40 to 95 parts by weight of one or more monomers (I) of formula:

$$CH_2=C(R_1)-C(=O)-O-A-C(=O)-C(R_2)=CH_2$$

in which
$R_1$ and $R_2$ are, independently, H or $CH_3$,
A is a divalent radical of formula:

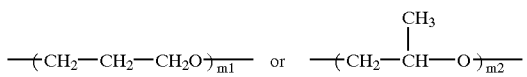

wherein $m_1$ and $m_2$ are each integers from 2 to 6;
− 5 to 50 parts by weight of a monomer (II) comprising at least one urethane unit and at least two (meth)acrylate functions; and
between 0 to 30% by weight, compared to the total of monomers (I) and (II) of one or more monomers (III), which are different from monomers (I) and (II) and polymerizable by free radical mechanisms and wherein the monomers (III) are such that they would result in a homopolymer with refractive index less than or equal to 1.54, if homopolymerized.

2. The composition of claim 1, wherein, in the formula of the monomer (I), said divalent unit A is:

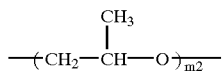

wherein $m_2$ is as defined in claim 1.

3. The composition of claim 1, wherein the monomer (II) is a urethane di(meth)acrylate oligomer.

4. The composition of claim 3, wherein the urethane di(meth)acrylate oligomer is an aliphatic polyester.

5. The composition of claim 1, wherein the monomer (II) has the formula:

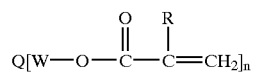

in which:

Q is a radical of valency n, comprising linear, branched or cyclic structure, containing at least two units of formula:

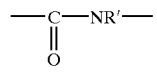

wherein R' is H or a valence bond;

W is a divalent alkyl radical, comprising linear or branched structure, comprising from 1 to 5 carbon atoms;

n varies from 2 to 4; and

R is H or $CH_3$.

6. The composition of claim 5, wherein W is further defined as —$CH_2CH_2$—.

7. The composition of claim 5, wherein, in the formula of the monomer (II), Q is a divalent radical of formula:

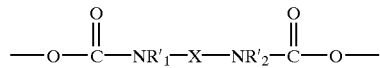

in which X is a linear or branched divalent alkyl chain comprising from 1 to 15 carbon atoms, and $R'_1$ and $R'_2$ independently represent H or $CH_3$.

8. The composition of claim 7, wherein X is a linear or branched divalent alkyl chain comprising from 8 to 12 atoms.

9. The composition of claim 7, wherein the monomer (II) has the formula:

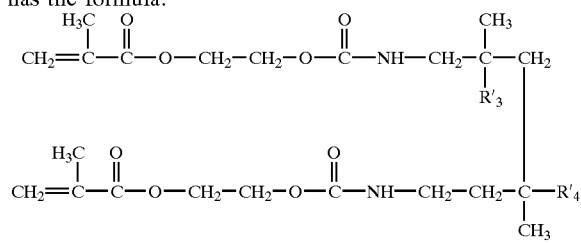

in which $R'_3$ and $R'_4$ independently represent H or $CH_3$.

10. The composition of claim 5, wherein, in the formula of the monomer (II), Q is a trivalent radical of formula:

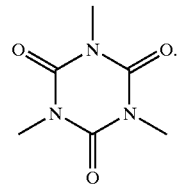

11. The composition of claim 10, wherein the monomer (II) has the formula:

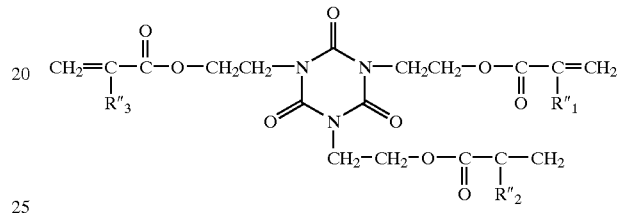

in which $R''_1$, $R''_2$ and $R''_3$ independently represent H or $CH_3$.

12. The composition of claim 1, further defined as comprising from 10 to 40 parts by weight of monomer (II).

13. The composition of claim 1, further defined as comprising between 0 to 10% by weight of monomers (III).

14. The composition of claim 1, wherein the monomers (III) are selected from the group consisting of the alkyl (meth)acrylates, the cycloalkyl (meth)acrylates, phenyl (meth)acrylate, benzyl (meth)acrylate, the naphthyl (meth) acrylates, the phenoxyalky (meth)acrylates, the alkylene glycol di(meth)acrylates, the poly(alkylene) glycol di(meth) acrylates, neopentyl glycol di(meth)acrylate, compounds of bisphenol-A di(meth)acrylate and mixtures thereof.

15. The composition of claim 1, wherein the monomers (III) correspond to formula (I) for which $m_1$ or $m_2$ is an integer greater than 6, and in that the quantity of these monomers (III) is such that the mean value of $m_1$ and/or $m_2$ corresponding to the total of the monomers corresponding to the formula (I) is less than 5.

16. The composition of claim 1, wherein the monomer (III) is a monomer with high Abbe number which comprises at least one non-aromatic cyclic or polycyclic hydrocarbon radical.

17. The composition of claim 16, wherein the monomer (III) is selected from at least one of the monomers of the following formula:

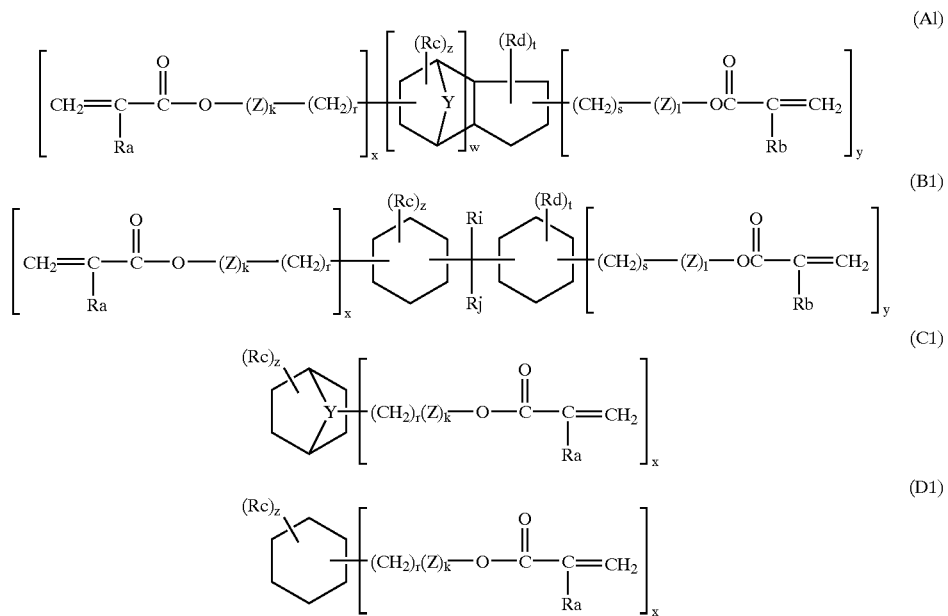

wherein, in each of these formulas:

Y is a divalent radical selected from the group consisting of: —O—, —CH$_2$—, —C(CH$_3$)$_2$—, and —C(H)(CH$_3$)—;

Z is a divalent radical selected from the group consisting of —(CH$_2$)$_p$—O—, wherein p is an integer from 1 to 4, and

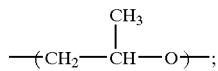

R$_a$, R$_b$ independently are H or CH$_3$;

R$_c$ and R$_d$ independently are a linear or branched alkyl radical comprising 1 to 6 carbon atoms;

R$_I$ and R$_j$ independently are a linear or branched alkyl radical comprising 1 to 10 carbon atoms, w is an integer from 1 to 3, x is an integer from 0 to 3, y is an integer from 0 to 3, on condition that x+y≧1, k is an integer from 0 to 6, 1 is an integer from 0 to 6, r is an integer from 0 to 6, s is an integer from 0 to 6, z is an integer from 0 to 3; and t is an integer from 0 to 3.

18. The composition of claim 17, wherein the monomer (III) is selected from the monomers of formula:

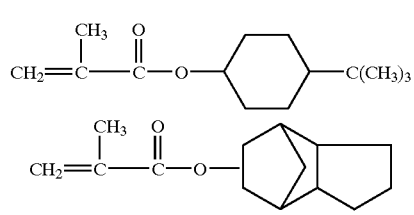

-continued

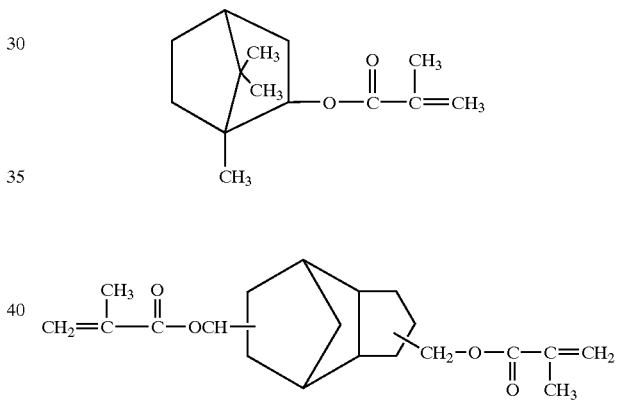

19. The composition of claim 1, wherein the monomers (II) and (III) are such that they would result in a homopolymer with refractive index less than or equal to 1.54, if homopolymerized.

20. The composition of claim 1, further defined as having a viscosity less than or equal to 0.3 Pa.s.

21. A transparent polymer substrate with a refractive index ranging from 1.48 to 1.52 obtained by the polymerization of a composition of polymerizable monomers comprising:

–40 to 95 parts by weight of one or more monomers (I) of formula:

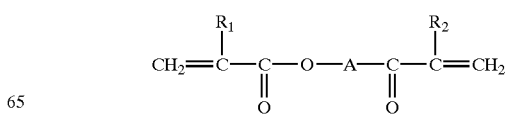

in which
R$_1$ and R$_2$ are, independently, H or CH$_3$,
A is a divalent radical of formula:

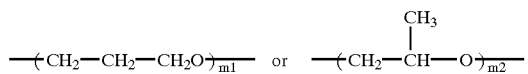

wherein m$_1$ and m$_2$ are each intergers from 2 to 6;

- −5 to 50 parts by weight of a monomer (II) comprising at least one urethane unit and at least two (meth)acrylate functions; and between 0 to 30% by weight, compared to the total weight of monomers (I) and (II) of one or more monomers (III), which are different from monomers (I) and (II) and polymerizable by free radical mechanisms and wherein the monomers (III) are such that they would result in a homopolymer with refractive index less than or equal to 1.54, if homopolymerized.

22. An optical lens comprising a polymer substrate with a refractive index ranging from 1.48 to 1.52 obtained by the polymerization of a composition of polymerizable monomers comprising:

−40 to 95 parts by weight of one or more monomers (I) of formula:

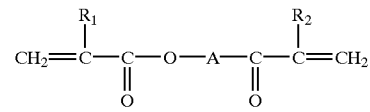

in which
R$_1$ and R$_2$ are, independently, H or CH$_3$,
A is a divalent radical of formula:

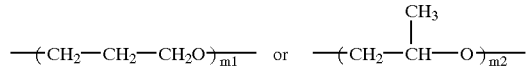

wherein m$_1$ and m$_2$ are each integers from 2 to 6;
  −5 to 50 parts by weight of a monomer (II) comprising at least one urethane unit and at least two (meth)acrylate functions; and
  between 0 to 30% by weight, compared to the total weight of monomers (I) and (II) of one or more monomers (II), which are different from monomers (I) and (II) and polymerizable by free radical mechanisms and wherein the monomers (III) are such that they would result in a homopolymer with refractive index less than or equal to 1.54, if homopolymerized.

23. The optical lens of claim 22, further defined as an ophthalmic lens.

24. The optical lens of claim 23, further defined as a spectacle lens.

25. The composition of claim 1, wherein monomers (I) have an average value of m of less than 5.

* * * * *

UNITED STATES PATENT AND TRADEMARK OFFICE
CERTIFICATE OF CORRECTION

PATENT NO.    : 6,677,420 B2
DATED         : January 13, 2004
INVENTOR(S)   : Richard et al.

It is certified that error appears in the above-identified patent and that said Letters Patent is hereby corrected as shown below:

Column 18,
Line 45, delete "the phenoxyalky" and insert -- the phenoxyalkyl -- therefor.

Column 22,
Line 20, delete "one or more monomers (II)" and insert -- one or more monomers (III) -- therefor.

Signed and Sealed this

Fifteenth Day of June, 2004

JON W. DUDAS
*Acting Director of the United States Patent and Trademark Office*